United States Patent [19]
Bobak et al.

[11] Patent Number: 6,061,771
[45] Date of Patent: *May 9, 2000

[54] CROSS-SYSTEM DATA PIPING SYSTEM USING AN EXTERNAL SHARED MEMORY

[75] Inventors: Roman A. Bobak, Wappingers Falls; Scott Brady Compton, Hyde Park; Jon K. Johnson, Pleasant Valley; Alan F. Martens, Wappingers Falls; Max M. Maurer, Gardiner; David Lee Meck, Hyde Park; William R. Richardson, Fishkill; Michael Allen Wright, Briarcliff Manor, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/846,714

[22] Filed: Apr. 30, 1997

[51] Int. Cl.[7] .................................................. G06F 15/16
[52] U.S. Cl. ..................... 711/169; 711/140; 711/147; 711/148; 711/153; 709/200; 709/213; 709/212
[58] Field of Search ..................................... 711/140, 147, 711/148, 153, 169; 395/309; 709/200, 213, 212

[56] References Cited

U.S. PATENT DOCUMENTS

| | | | |
|---|---|---|---|
| 5,317,739 | 5/1994 | Elko et al. ............................. | 395/700.4 |
| 5,325,492 | 6/1994 | Bonevento ............................... | 395/309 |
| 5,410,695 | 4/1995 | Frey et al. ............................... | 395/680 |
| 5,448,708 | 9/1995 | Ward ................................... | 395/200.65 |
| 5,448,734 | 9/1995 | Hrabik et al. ........................... | 709/300 |
| 5,564,019 | 10/1996 | Beausoleil et al. ..................... | 709/215 |
| 5,577,229 | 11/1996 | Wakerly .................................. | 711/147 |
| 5,586,299 | 12/1996 | Wakerly .................................. | 711/149 |
| 5,666,521 | 9/1997 | Marisetty ................................. | 345/525 |
| 5,706,432 | 1/1998 | Elko et al. ............................... | 709/213 |

OTHER PUBLICATIONS

A.B. McNeill and E.I. Wachtel, "Cached Shared Memory for Distributed Subsystems," IBM Technical Disclosure Bulletin, vol. 37 No. 06B, pp. 237–246 (Jun. 1994).

Primary Examiner—Do Hyun Yoo
Assistant Examiner—Than Nguyen
Attorney, Agent, or Firm—William A. Kinnaman, Jr.; Heslin & Rotherberg, P.C.

[57] ABSTRACT

Data is written to and read from a shared pipe by applications of multiple systems. At least one shared pipe is located within an external shared memory coupled to one or more central processing complexes. Each of the central processing complexes has one or more operating system images, which controls execution of one or more piping applications. At least one piping application corresponding to at least one operating system image writes data to a shared pipe located in the external shared memory and at least one other application corresponding to one or more other operating system images reads data from the same shared pipe, thereby providing cross-system data piping.

24 Claims, 11 Drawing Sheets fig. 1A fig. 1B fig. 1C fig. 2a fig. 2b fig. 3 fig. 4 fig. 5 fig. 6 fig. 7 fig. 8 fig. 9 fig. 10 fig. 11

CROSS-SYSTEM DATA PIPING SYSTEM USING AN EXTERNAL SHARED MEMORY

CROSS REFERENCE TO RELATED APPLICATIONS

This application contains subject matter which is related to the subject matter of the following applications, which are assigned to the same assignee as this application and filed on the same day as this application. The below listed applications are hereby incorporated herein by reference in their entirety:

"Cross-System Data Piping Method Using An External Shared Memory," by Bobak et al., Ser. No. 08/846,718; and "Cross-System Data Piping Using An External Shared Memory," by Bobak et al., Ser. No. 08/846,713.

TECHNICAL FIELD

This invention relates, in general, to data piping between applications and, in particular, to using shared pipes within an external shared memory to perform data piping between applications of different systems.

BACKGROUND ART

Simple data piping between two units of work (e.g., a writer application and a reader application) includes the writer application writing data to a pipe and the reader application reading data from the pipe. In one example, the pipe is a first in-first out (FIFO) queue, which is a conduit of a stream of data. As data is written to the pipe, the data is read from the pipe.

Within a single system (i.e., one operating system image), data piping is typically implemented using a FIFO buffer queue structure located in inboard memory. The pipe is accessible to both applications participating in the piping. Further, in single systems, multiple writer and reader applications of the same single system can access the same pipe, providing for a shared pipe. The shared pipe enhances performance by allowing the multiple writers and readers of the single system to access the shared pipe, concurrently.

In addition to the above, data piping has been performed between applications on two different systems, using point-to-point communication lines. In particular, the pipe is maintained on at least one of the two systems participating in the piping (i.e., at least one of the systems dispatching the work units) and there is a direct, static connection between the two systems.

However, a need still exists for a cross-system data piping facility that can be extended beyond two systems. Further, a need exists for a dynamic cross-system data piping facility that allows dynamic connections to a shared pipe and does not require static connections between the systems and the pipe. A yet further need exists for a cross-system data piping facility that enables the shared pipe to be separate from the systems that are dispatching the work.

SUMMARY OF THE INVENTION

The shortcomings of the prior art are overcome and additional advantages are provided through the provision of a cross-system data piping system. In one example, the cross-system data piping system includes a first system adapted to write data to a pipe located within an external shared memory. The first system has a first operating system image and the external shared memory has processing capabilities. Additionally, the cross-system data piping system includes a second system adapted to read data from the pipe. The second system has a second operating system image, and the external shared memory is coupled to the first system and the second system, such that the pipe is separate from the first and second systems.

In one example, the first system is located within a central processing complex coupled to the external shared memory and the second system is located within another central processing complex coupled to the external shared memory.

In another example, the first and second systems are located within the same central processing complex coupled to the external shared memory.

In another embodiment, the first and second systems and the pipe are included in a first pipeplex. Further, the system includes a second pipeplex, in which the second pipeplex includes another pipe located within the external shared memory and at least one system of the first system, the second system and another system.

In yet another embodiment of the invention, the pipe of the first pipeplex is located within a first list structure of the external shared memory and the another pipe of the second pipeplex is located within a second list structure of the external shared memory.

In other embodiments of the invention, means for allocating, opening and closing the pipe are provided.

The cross-system data piping capability of the present invention advantageously enables the sharing of one or more data pipes across systems within a system processing complex. The systems can be included within one central processing complex or a plurality of central processing complexes. In accordance with the principles of the present invention, multiple readers and writers from multiple systems can access a shared pipe, which is located in a storage facility separate from any of the systems issuing the requests. The cross-system data piping capability of the present invention advantageously allows dynamic connections to one or more shared pipes and the efficient balancing of work loads throughout the processing complex by not requiring all users of a common pipe to exist on the same system image.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a cross-system data piping capability is provided, in which multiple readers and writers of different systems can access one or more shared pipes. As one example, the one or more shared pipes is located within an external shared memory coupled to, but different from, the different systems.

Figure 1A:
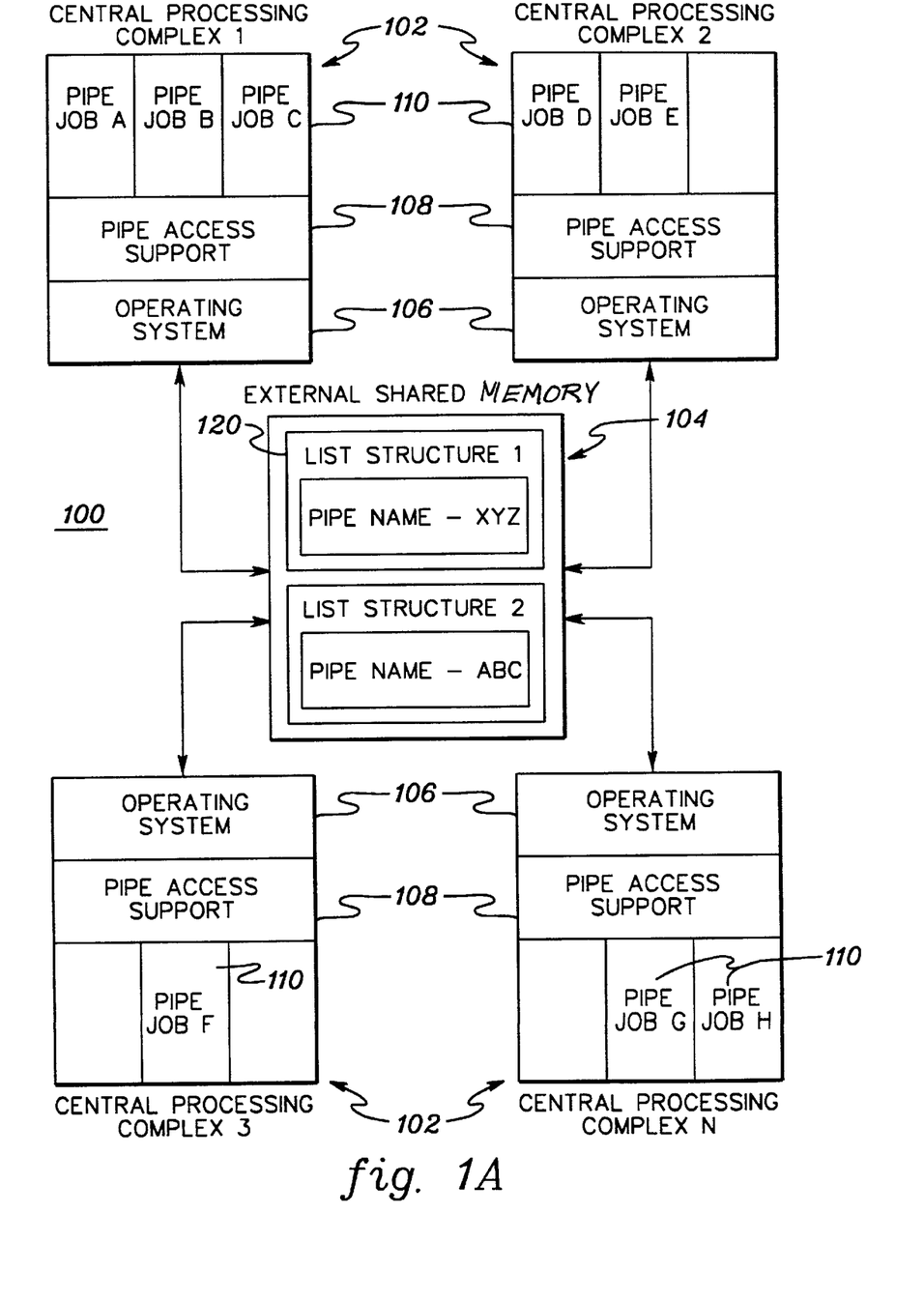
FIG. 1a depicts one example of a system processing complex (SYSPLEX) incorporating and using the cross-system data piping capability of the present invention.
Figure 1B:
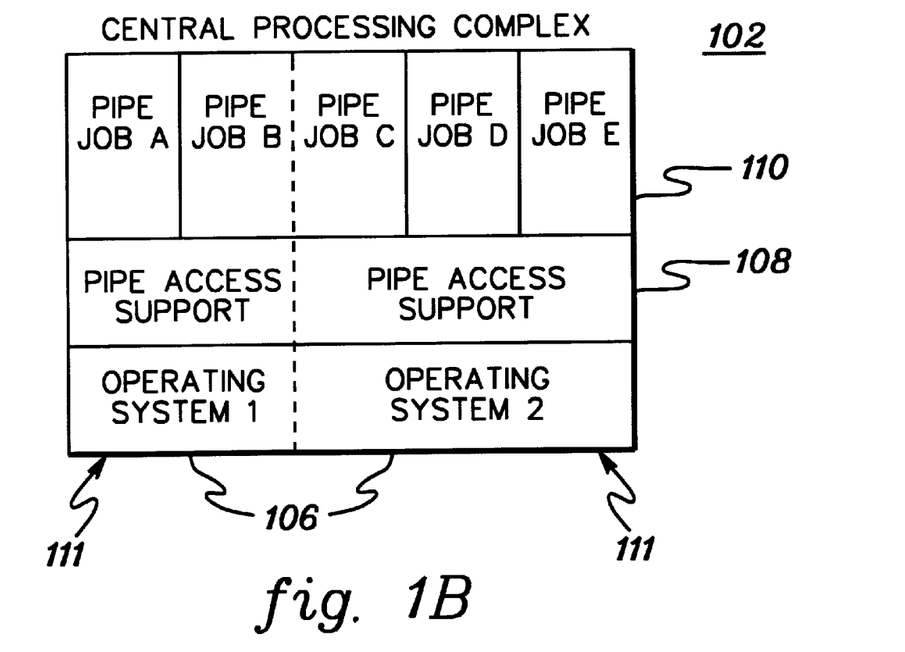
FIG. 1b depicts one example of a single central processing complex, including a plurality of operating systems, which incorporates and uses the cross-system data piping capability of the present invention.

One embodiment of a computing environment incorporating and using the cross-system data piping capability of the present invention is depicted and described in detail with reference to FIGS. 1a–1b. In one example, a systems processing complex (SYSPLEX) 100 (FIG. 1a) includes one or more central processing complexes 102 (also referred to as processors or central electronic complexes) coupled to at least one external shared memory 104.

In one example, each central processing complex 102 is designed following the Enterprise Systems Architecture (ESA)/390 offered by International Business Machines Corporation. (Enterprise Systems Architecture/390 is described in detail in, for instance, "Enterprise Systems Architecture/390 Principles of Operation," Publication Number SA22-7201-02, Third Edition (February 1995), which is offered by International Business Machines Corporation, and is hereby incorporated herein by reference in its entirety.)

In one example, each central processing complex includes an operating system image 106, a pipe access support 108 and at least one piping application 110. In another example, a central processing complex 102 includes a plurality of systems 111 (FIG. 1b), and each system 111 includes an operating system image 106, a pipe access support 108 and at least one piping application 110, each of which is described below. Thus, in accordance with the principles of the present invention, a central processing complex includes one or more systems, each having its own operating system image and pipe access support.

One example of an operating system includes the Multiple Virtual Storage (MVS)/ESA operating system, offered by International Business Machines Corporation (or the OS/390 operating system offered by International Business Machines Corporation). Each central processing complex can include one or more images of MVS/ESA, and/or one or more of various other operating system images or any combination of the above. As is known, each operating system image controls the execution of programs running within the system associated therewith and the processing of data.

One or more subsystems can run under the control of an operating system image, such as the MVS/ESA operating system. One example of a subsystem running on MVS/ESA and using the cross-system piping capability of the present invention is IBM BatchPipes/MVS (hereinafter referred to as BatchPipes). BatchPipes is described in detail in "IBM SMARTBATCH For OS/390 Users Guide and Reference", Publication Number GC28-1640-00, First Edition, March 1997, which is offered by International Business Machines Corporation, and is hereby incorporated herein by reference in its entirety.

Pipe access support 108 includes a data access technique used by piping applications 110 to access a pipe 112 (see FIG. 1c), such as a first in-first out (FIFO) queue. In one example, the data access technique includes a sequential access method, such as QSAM or BSAM. Pipe access support 108 further includes the processing logic used for the cross-system data piping capability of the present invention, as described in further detail below.

Figure 1C:
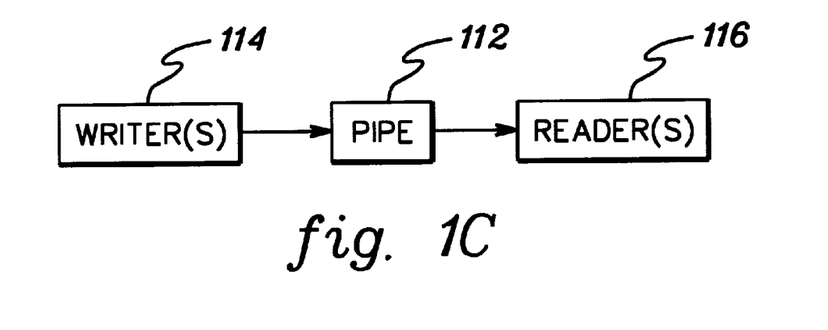
FIG. 1c depicts one embodiment of two piping applications coupled to one another via a pipe, in accordance with the principles of the present invention.

Piping applications 110 use a pipe through standard access methods (e.g., QSAM, BSAM), such as pipe 112 (FIG. 1c), as a medium to transport data from one application to another application. As shown in FIG. 1c, in one example, one or more writers 114 (e.g., writer applications) write data to pipe 112 and one or more readers 116 (e.g., reader applications) read the data from the pipe. The data can be read from the pipe as soon as there is some data to be read. The reader does not have to wait until all the data to be written by the writer is within the pipe.

Referring back to FIG. 1a, each of the central processing complexes 102 is coupled to external shared memory 104. In one embodiment, the external shared memory (also referred to as a coupling facility) is a structured-external storage (SES) processor, which includes a communications facility for communicating with the processors, a shared memory facility for storing shared data and for maintaining shared pipes, in accordance with the principles of the present invention, and a processing facility for managing the shared data and the shared pipes and for providing other functions. The external shared memory handles management tasks that were once handled by the individual systems or processors. The external shared memory relieves the individual systems or processors of those tasks, such as the storage management tasks.

One example of an external shared memory is described in detail in U.S. Pat. No. 5,317,739, "Method and Apparatus for Coupling Data Processing Systems," Elko et al, issued on May 31, 1994 and assigned to International Business Machines Corporation, which is hereby incorporated herein by reference in its entirety.

In one example, external shared memory 104 includes one or more list structures 120 used to perform cross-system piping between pipe applications on any of the systems connected to the list structures. In particular, one or more of the systems can choose to connect to a specifically named list structure by having its pipe access support perform a connect operation to that named list structure. The system(s) connected to that list structure then use the list structure, and more specifically, the one or more pipes within the list structure, to perform cross-system piping, as described in further detail below.

In accordance with the principles of the present invention, cross-system piping can occur within one central processing complex or between central processing complexes connected to a named list structure. For example, cross-system piping can occur within one central processing complex, which has a plurality of operating system images. If an application associated with one operating system image writes to a pipe of the named list structure and another application associated with another operating system image of the same central processing complex reads data from the same pipe, then cross-system piping has occurred.

As a further example, cross-system piping can occur between two or more central processing complexes connected to a list structure. For instance, if a system of Central Processing Complex 1 and a system of Central Processing Complex 3 have connected to List Structure 1, then applications of Central Processing Complex 1 can write and/or read data from a pipe of List Structure 1 and applications of Central Processing Complex 3 can also write and/or read data from the same pipe. This is also cross-system piping.

In accordance with the principles of the present invention, the set of systems connected to a particular list structure (or to a commonly shared area in the external shared memory) is referred to as a pipeplex, and each system within the pipeplex shares the named list structure. When a list structure is allocated, headers for one or more pipes are set aside for allocation to the pipes, as described below. Once the pipeplex is created, then one or more pipes can be defined within the pipeplex.

Figure 2A:
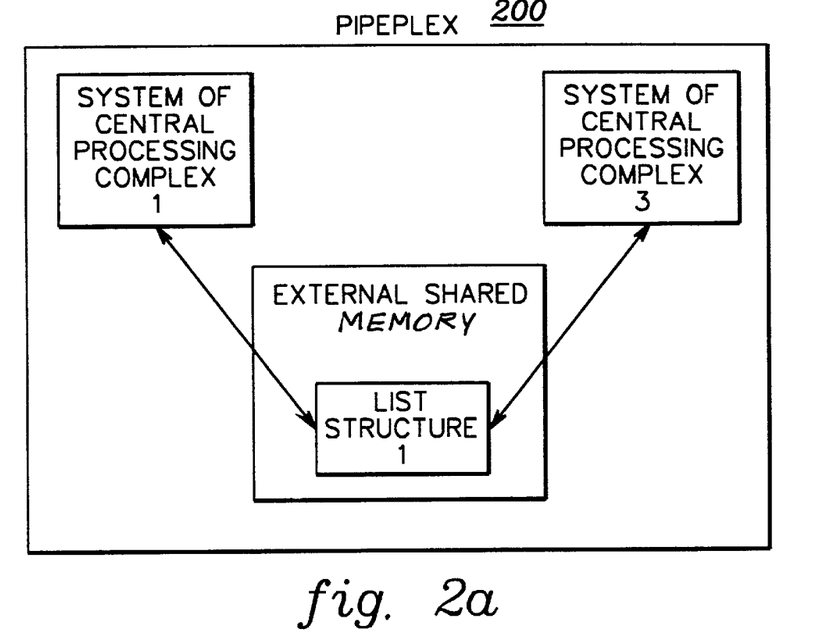
FIGS. 2a–2b depict examples of pipeplexes created in accordance with the principles of the present invention.

One example of a pipeplex is depicted in FIG. 2a. If a system of Central Processing Complex 1 and a system of Central Processing Complex 3 each connect to List Structure 1, then a pipeplex 200, including those two systems and the list structure, is formed. Thus, Central Processing Complexes 1 and 3 would share the list structure. More specifically, the systems within those complexes connected to the list structure would share the pipe(s) within the list structure, in order to perform cross-system piping.

Figure 2B:
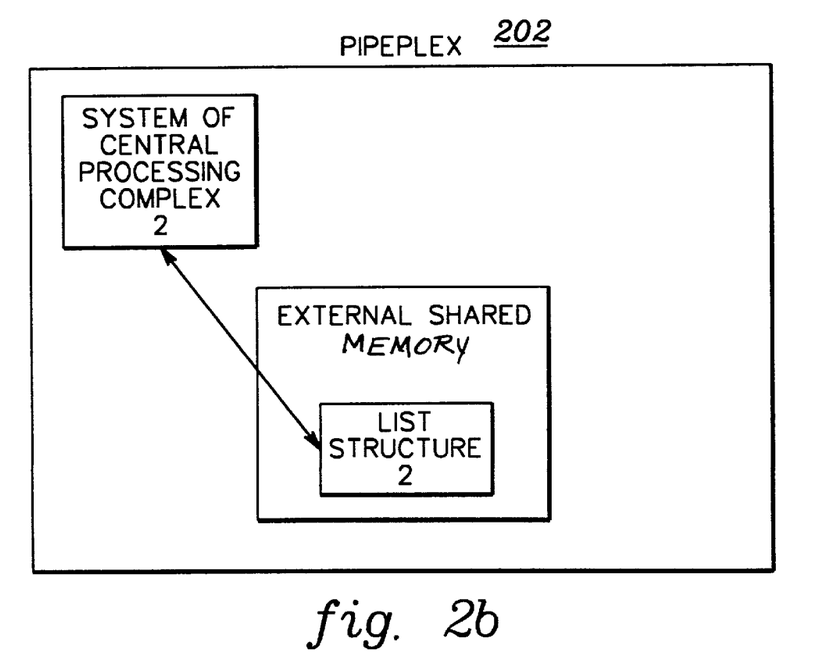

As another example, if a system of Central Processing Complex 2 (FIG. 2b) connected to a List Structure 2 and no other systems or complexes were connected, then the system of Central Processing Complex 2 would be in its own pipeplex 202, along with List Structure 2.

As a further example, one or more systems can be a part of one or more pipeplexes. For instance, a system can be a part of one pipeplex and a part of one or more other pipeplexes. Additionally, systems can dynamically join or leave a pipeplex.

For instance, to dynamically join a pipeplex, a connection operation of the external shared memory is used to connect to the list structure. Further, the system registers itself within the pipeplex, as described herein.

As a further example, to dynamically leave a pipeplex, the list structure connection is disconnected and the registration of the system is deleted.

Figure 3:
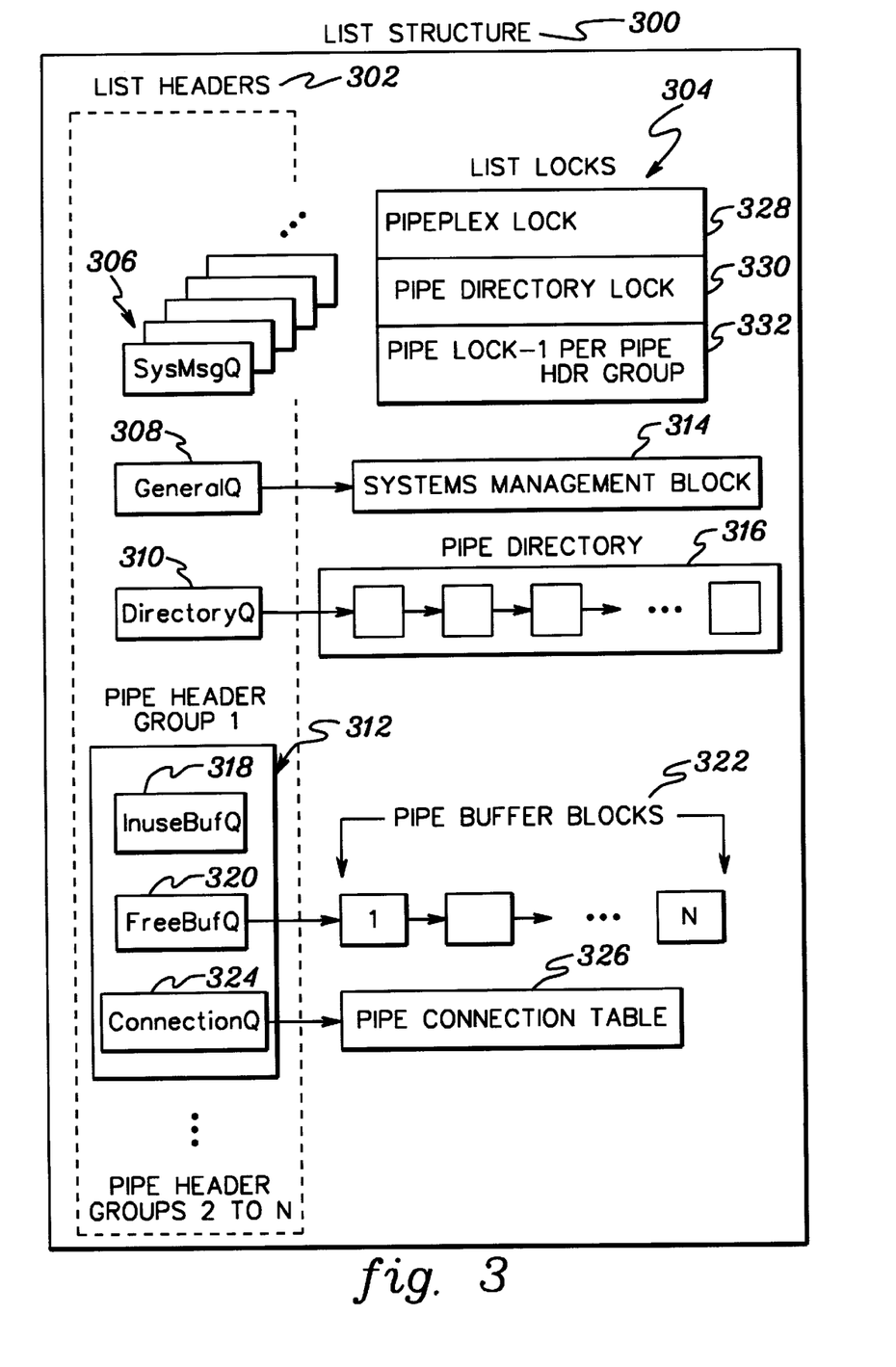
FIG. 3 depicts one embodiment of cross-system piping control structures within a shared list structure, in accordance with the principles of the present invention.

One example of a list structure and in particular, the control structures of the list structure used for cross-system piping, is described in detail with reference to FIG. 3. In one embodiment, a list structure 300 includes a plurality of list headers 302 and various list locks 304. The list headers and list locks are created and/or set by, for instance, the pipe access support of the first system connecting to the named list structure. List headers 302 and list locks 304 are described in further detail below.

In one example, list headers 302 include a set of system message queue headers 306, a general queue header 308, a directory queue header 310, and one or more pipe header groups 312, each of which is described below.

The set of system message queue headers is defined for sending messages between the pipe access support on the systems connected to the list structure. As one example, there is one message queue header for each system that connects to list structure 300. Whenever the pipe access support on one system needs to communicate to the pipe access support on another system, it builds a message, places it in a message block and performs a writecreate operation to add the message block to the bottom of the target system's message queue within the external shared memory, as defined by that system's message queue header. Thereafter, list header transition support within the external shared memory notifies an exit on the target system whenever its message queue header transitions from empty to nonempty. This triggers the pipe access support on the target system to read in and process any pending messages within its queue.

General queue header 308 is defined by the pipe access support to anchor control blocks that are needed to manage a pipeplex (i.e., the systems connected to the named list structure). A systems management block 314 is anchored to the general queue header. In one example, systems management block 314 includes an array of 1 to N entries used to keep track of the systems that have connected to the list structure. This aids in system cleanup if, for example, a system within the pipeplex fails.

Directory queue header 310 is defined by the pipe access support to anchor a pipe directory 316. Pipe directory 316 includes, for instance, an entry for each pipe in use across the pipeplex. Each entry includes, for instance, the name and characteristics of a pipe being used and an indication of which systems are using the pipe. The pipe characteristics recorded include, for example, a maximum block size to be written to the pipe and the number of pipe buffer blocks required (i.e., the pipe depth), described below. The directory further includes an allocation map for assigning the pipe header groups to the pipes, when they are initially allocated. In one instance, the allocation map within the pipe directory includes a bit for each pipe of the list structure.

A set of 1 to N pipe header groups is defined for doing cross-system piping. The number of pipe header groups defined depends on the available space allocated to the list structure, when it is created. A pipe header group is assigned to each cross-system pipe when the pipe is first allocated to the pipeplex. In one example, each pipe header group 312 includes the following three headers:

(a) An in-use buffer queue header 318, which is used to keep track of one or more pipe buffer blocks 322 of an in-use buffer queue that is currently being used;

(b) A free buffer queue header 320, which is used to keep track of one or more pipe buffer blocks 322 on a free buffer queue that were created during pipe open processing and are available for receiving data; and (c) A connection queue header 324, which is used to anchor a pipe connection table 326 established at pipe allocation time and used to keep track of which reader and writer pipe applications have connected to the pipe.

In addition to the list headers described above, list structure 300 also includes list locks 304. In one embodiment, list locks 304 includes a set of locks defined by the pipe access support for use in serializing processing against the control structures of the list structure. (Serializing ensures that only one entity (e.g., one pipe access support) is updating a control structure, at a given time). List locks 304 include, for instance, the following locks:

(a) A pipeplex lock 328, which is used to serialize processing dealing with the management of the pipeplex, such as the updating of systems management block 314;

(b) A directory lock 330, which is used to serialize all updates to pipe directory 316; and (c) A pipe lock 332 for each pipe header group, which is used to serialize the initial creation of pipe buffer blocks 322 of the free buffer queue header and to serialize the creation of the pipe connection table 326 and all subsequent updates to the table.

Described in detail above are the control structures used in the cross-system data piping of the present invention. Additional details associated with list structures, including, but not limited to, creating and connecting to list structures and operations used to manage the list structures are described in detail in, for instance, U.S. Pat. No. 5,410,695 "Apparatus and Method for List Management In a Coupled Data Processing System," Frey et al., issued on Apr. 25, 1995 and assigned to International Business Machines Corporation, which is hereby incorporated herein by reference in its entirety.

Processing associated with the cross-system data piping capability of the present invention is described in detail below with reference to FIGS. 4–11. In one embodiment, when an application names a pipe, thus indicating a desire to use the pipe, the pipe is allocated. In particular, the pipe access support on the system requesting access to the pipe, obtains pipe directory lock 330 to serialize the directory and searches pipe directory 316 to determine whether the named pipe already exists in the pipeplex. If the pipe does not exist, then one needs to be allocated.

Figure 4:
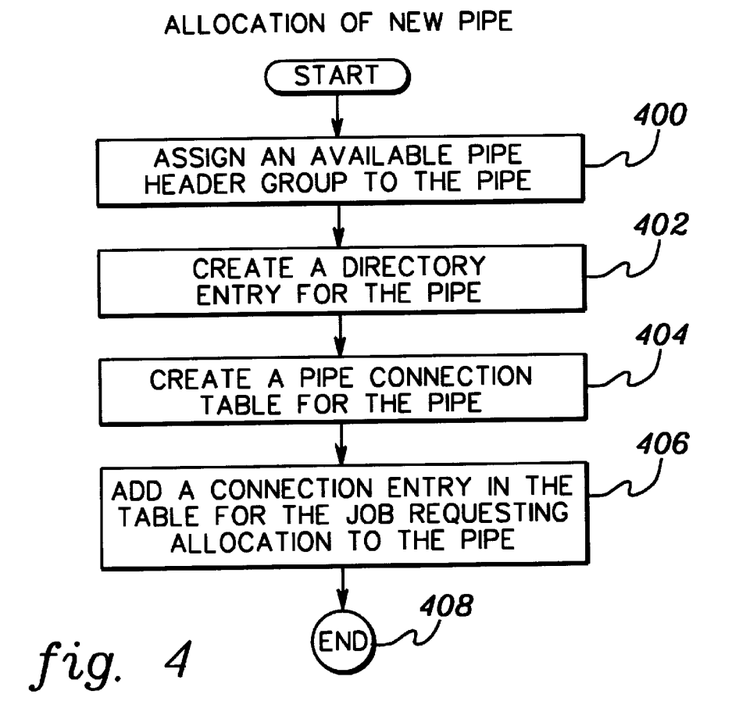
FIG. 4 depicts one embodiment of the logic associated with allocating a new pipe, in accordance with the principles of the present invention.

One example of allocating a new pipe is described in detail with reference to FIG. 4. Initially, an available pipe header group 312 is assigned to the pipe, STEP 400. In particular, the allocation map in the directory is scanned to locate an available pipe header group, which is assigned to the pipe. If no pipe header group is available, then the allocate processing fails. However, when a pipe header group is available, then allocate processing continues, as follows.

In one example, an entry for the pipe is created in pipe directory 316, STEP 402. In particular, while the lock is still held, the entry is created. The entry (or pipe directory block) records the name of the pipe, the number of the pipe obtained from the bit map, and the characteristics of the pipe, such as the maximum block size and the required number of buffer blocks. This information is supplied by, for instance, control information supplied by the application requesting the allocation.

Further, a pipe connection table 326 is created for the pipe and it is attached to connection queue header 324 in the assigned pipe header group, STEP 404. Thereafter, a connection entry is added to pipe connection table 326 for the application requesting allocation to the pipe, STEP 406. In particular, pipe lock 332 for the header group is obtained to serialize the connection table, and the entry is created. The connection entry includes, for instance, the name of the requesting application, the system it is running on, the type of connection (e.g., a reader or a writer) and the current status of the application's connection (e.g., allocated). Processing of the allocation of a new pipe is then complete, STEP 408.

When the pipe directory search indicates that the pipe is already created, then allocation of an existing pipe is performed. One example of such an allocation is described with reference to FIG. 5.

Figure 5:
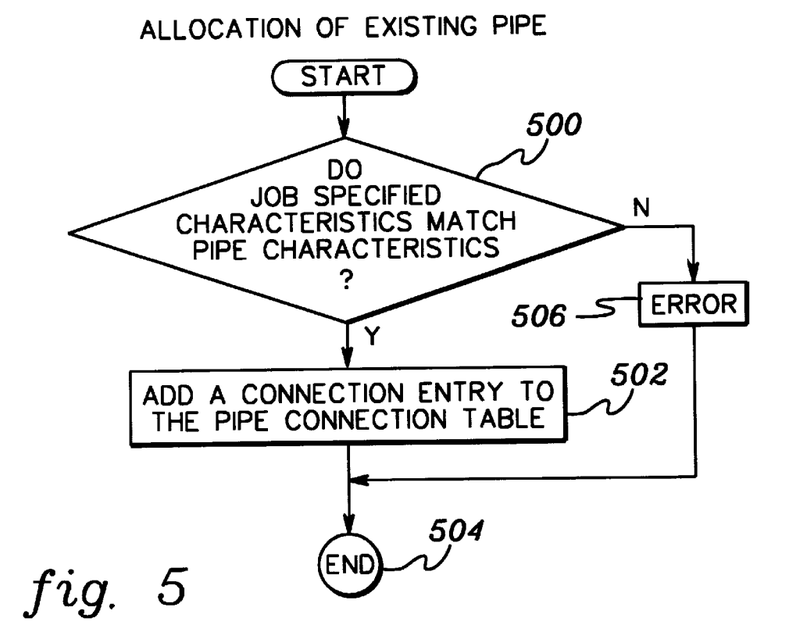
FIG. 5 depicts one embodiment of the logic associated with allocating an existing pipe, in accordance with the principles of the present invention.

Initially, while still holding the pipe directory lock, a determination is made as to whether the pipe characteristics specified by the application requesting the allocation properly match the characteristics of the pipe, as designated in pipe directory 316, INQUIRY 500. When the characteristics do match, then a connection entry is added to pipe connection table 326 for the requesting application, STEP 502. As before, the connection entry includes information, such as the name of the requesting application, the system it is running on, the type of connection (e.g., a reader or a writer) and the current status of the application's connection (e.g., allocated). Thereafter, the allocation processing of an existing pipe is complete, STEP 504.

Returning to INQUIRY 500, if, however, the characteristics do not match, then an error is generated, STEP 506, and allocation processing is ended, STEP 504.

Subsequent to allocating a pipe, a request by an application to open a pipe can be serviced by the pipe access support on the requestor's system. One example of opening a pipe is described in detail with reference to FIG. 6.

Figure 6:
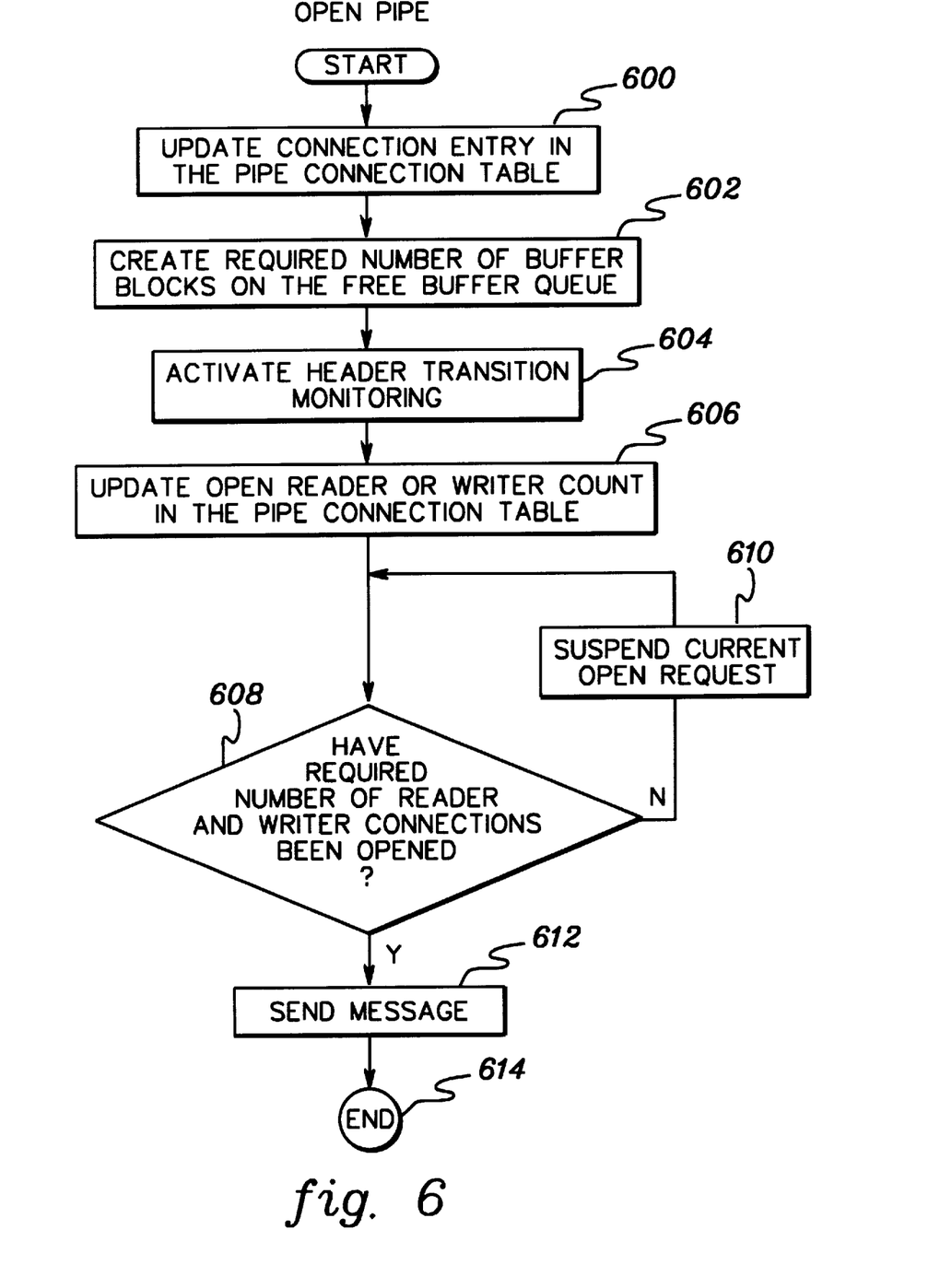
FIG. 6 depicts one example of the logic associated with opening a pipe, in accordance with the principles of the present invention.

Initially, the connection entry in pipe connection table 326 is updated to indicate that an open was issued, STEP 600. As described above, when the connection table is updated, pipe lock serialization is obtained.

In addition to the above, in one instance, a required number of pipe buffer blocks 322 are created and placed on a free buffer queue identified by free buffer queue header 320, if this is the first open to the pipe within the pipeplex, STEP 602. Subsequently, header transition monitoring for the free buffer queue and the in-use buffer queue is activated, if this is the first open to the pipe on the system where the open was issued, STEP 604. In one example, the monitoring is activated by notifying the external shared memory that such monitoring is to take place. Processing logic within the external shared memory then manages the monitoring, as described in detail in U.S. Pat. No. 5,410,695 "Apparatus and Method for List Management In a Coupled Data Processing System," Frey et al., issued on Apr. 25, 1995 and assigned to International Business Machines Corporation, which is hereby incorporated herein by reference in its entirety.

Next, an open reader count or an open writer count located within pipe connection table 326 is updated (e.g., incremented by one) depending on whether the type of connection is a reader connection or a writer connection, STEP 606. After updating the appropriate count, a determination is made as to whether the required number of reader and writer job connections have been opened to the pipe, INQUIRY 608.

When the required number of connections have not been made, then the remaining actions to be taken for the current open request are suspended until the required number of connections have been opened, STEP 610. After the required number of connections have been opened, a message is sent to all the systems of the pipeplex to notify the pipe access support of those systems that the applications currently being suspended can continue processing, STEP 612. That is, open processing is complete for the suspended requests, STEP 614.

Subsequent to opening a pipe, data can be written to the pipe and read from the pipe, as described herein. In one embodiment, data is written to a pipe when a writer issues a Put request to the pipe that results in filling its instorage buffer. In accordance with the principles of the present invention, when a Put request is issued, the pipe access support of the requesting processor issues a Move-Write operation to write the user specified buffer to an available buffer block at the top of the pipe's free buffer queue, and to move the buffer block to the bottom of the pipe's in-use buffer queue. This occurs as a single atomic operation. One example of the processing associated with a Put request is described below with reference to FIG. 7.

Figure 7:
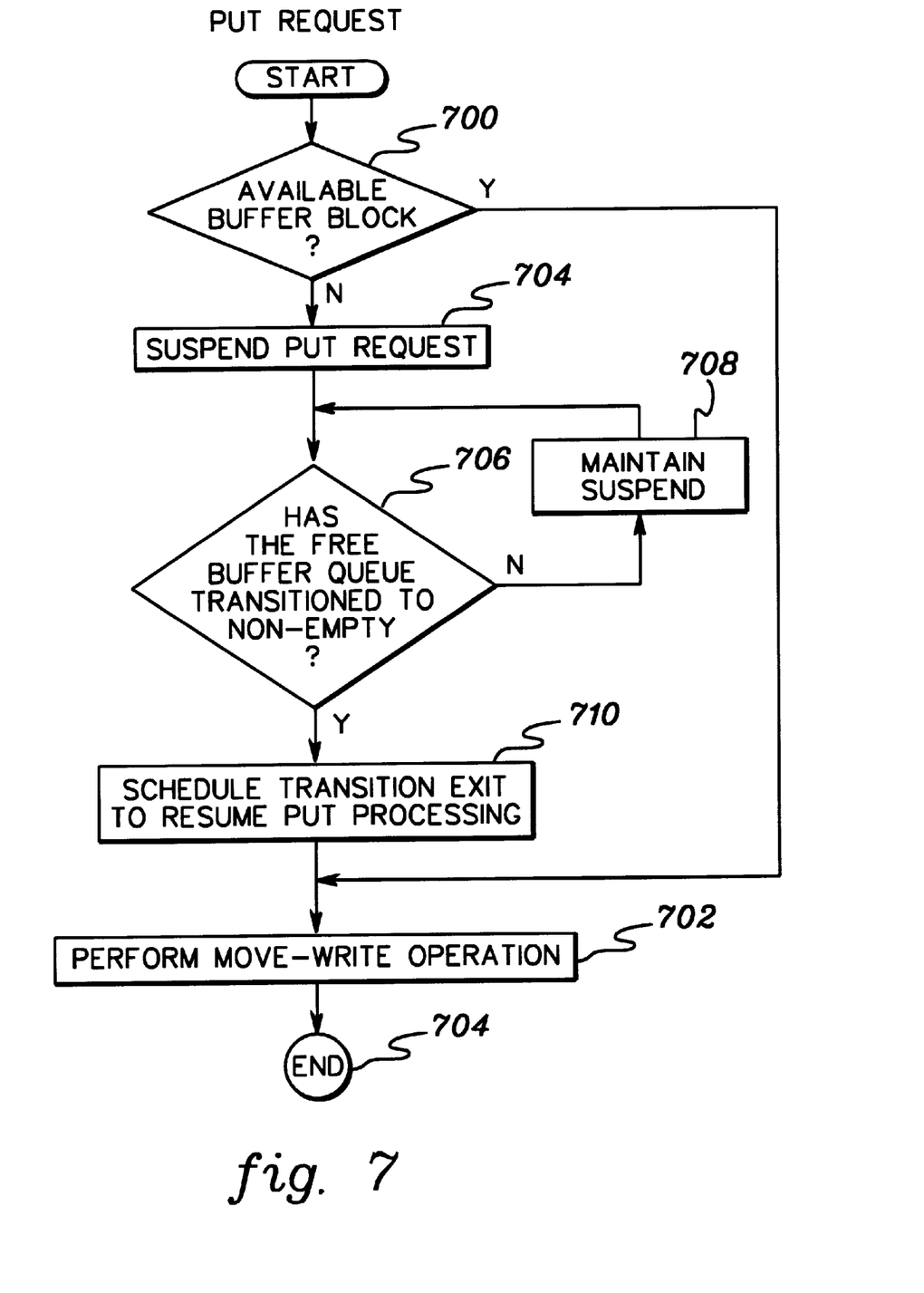
FIG. 7 depicts one example of the logic associated with a writing data to a pipe, in accordance with the principles of the present invention.

When a Put request is issued, a determination is made as to whether there are any available buffer blocks on the pipe's free buffer queue, INQUIRY 700. If there are free buffer blocks, then a Move-Write operation is performed to move the data from the user's buffer block to one of the pipe's free buffer blocks, STEP 702. Additionally, during the same atomic operation, the written to buffer block is moved to the bottom of the pipe's in-use buffer queue.

On the other hand, if there are no available buffer blocks on the pipe's free buffer queue, the pipe is considered to be full. That is, all of the pipe buffer blocks are on the in-use buffer queue instead of the free buffer queue. This full condition is encountered when, for instance, an issued Move-Write operation fails.

When the pipe is full indicating that the free buffer queue is empty, pipe access support 108 on the requesting system suspends the Put request, STEP 704. The Put request remains suspended until the free buffer queue header 320 transitions from empty to nonempty, INQUIRY 706. In particular, a transition occurs when a Move-Read operation is performed, as described below.

Until a Move-Read operation is performed or some other mechanism is used to place pipe buffer blocks on the free buffer queue, the suspended Put request is maintained, STEP 708. However, when, for instance, a Move-Read operation reads a buffer from the in-use buffer queue and moves it to the free buffer queue, then the free buffer queue has transitioned from empty to nonempty. Thus, pipe access support 108 schedules a transition exit on all the systems currently monitoring the free buffer queue header, STEP 710. The transition exit on each system triggers resumption of all the in-process Put requests for that system that were suspended due to the previously empty free buffer queue. This includes performing the issued Move-Write operations, STEP 702.

As data is written to a named pipe, readers can read the data from the pipe. In order to read the data, a Get request is issued by an application connected to the pipe. In accordance with the principles of the present invention, the application can be in the same central processing complex as the writer application or it can be in a different central processing complex. It is, however, part of the same pipeplex, as the pipe.

When a reader issues a Get request to the pipe, the pipe access support of the requesting system issues a Move-Read operation to read in data from the buffer block currently at the top of the pipe's in-use buffer queue and to move the buffer block to the pipe's free buffer queue (e.g., the bottom or top of the queue). As with the Move-Write operation, the Move-Read operation is also a single atomic operation. One example of Get processing is described in detail with reference to FIG. 8.

Figure 8:
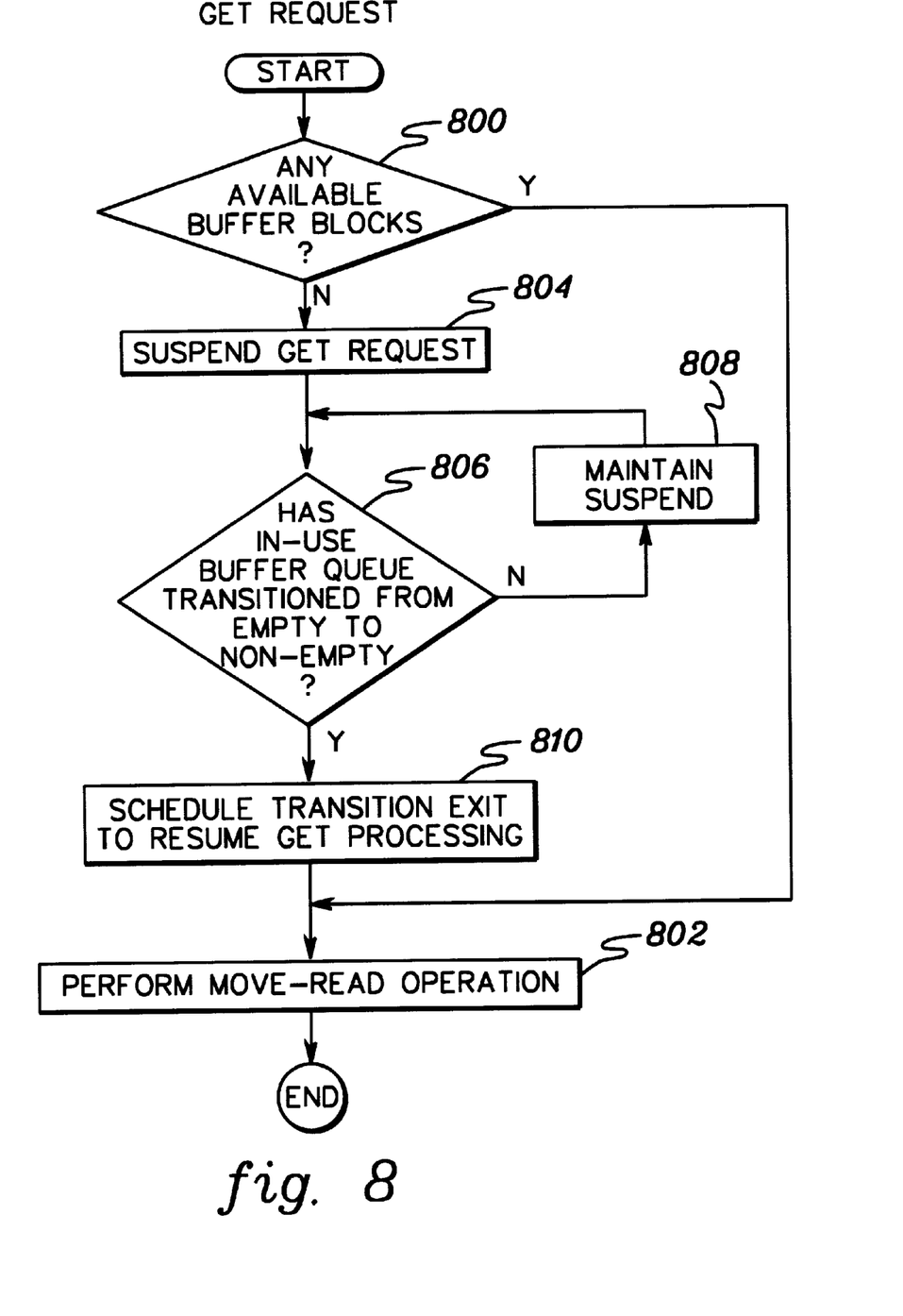
FIG. 8 depicts one example of the logic associated with reading data from a pipe, in accordance with the principles of the present invention.

When a Get request is issued, a determination is made as to whether there are any available buffer blocks on the pipe's in-use buffer queue, INQUIRY 800. If there are available buffer blocks, then a Move-Read operation is performed to read the data from the buffer block on top of the in-use buffer queue and to move the buffer block from the in-use buffer queue to the pipe's free buffer queue, STEP 802.

On the other hand, if there are no buffer blocks on the pipe's in-use buffer queue, the pipe is considered to be empty. That is, all of the pipe buffer blocks are on the free buffer queue instead of the in-use buffer queue. This empty condition is encountered when, for instance, an issued Move-Read operation fails.

When the pipe is empty indicating that the in-use buffer queue is empty, pipe access support 108 on the requesting system suspends the Get request, STEP 804. The Get request remains suspended until the in-use buffer queue header 318 transitions from empty to nonempty, INQUIRY 806. In particular, a transition occurs when a Move-Write operation is performed, as described above.

Until a Move-Write operation is performed or some other mechanism is used to place pipe buffer blocks on the in-use buffer queue, the suspended Get request is maintained, STEP 808. However, when, for instance, a Move-Write operation writes data to a buffer block on top of the free buffer queue and then moves the block to the in-use buffer queue, the in-use buffer queue transitions from empty to nonempty. Thus, pipe access support 108 schedules a transition exit on all the systems currently monitoring the in-use buffer queue header, STEP 810. The transition exit on each system triggers resumption of all the in-process Get requests for that system that were suspended due to the previously empty in-use buffer queue. This includes performing the issued Move-Read operations, STEP 802.

As described above, the Move-Write and Move-Read operations are atomic operations. Thus, multiple readers and writers can share a cross-system pipe and perform the Get/Put processing without holding a lock for serialization. One example of this is depicted in FIG. 9.

Figure 9:
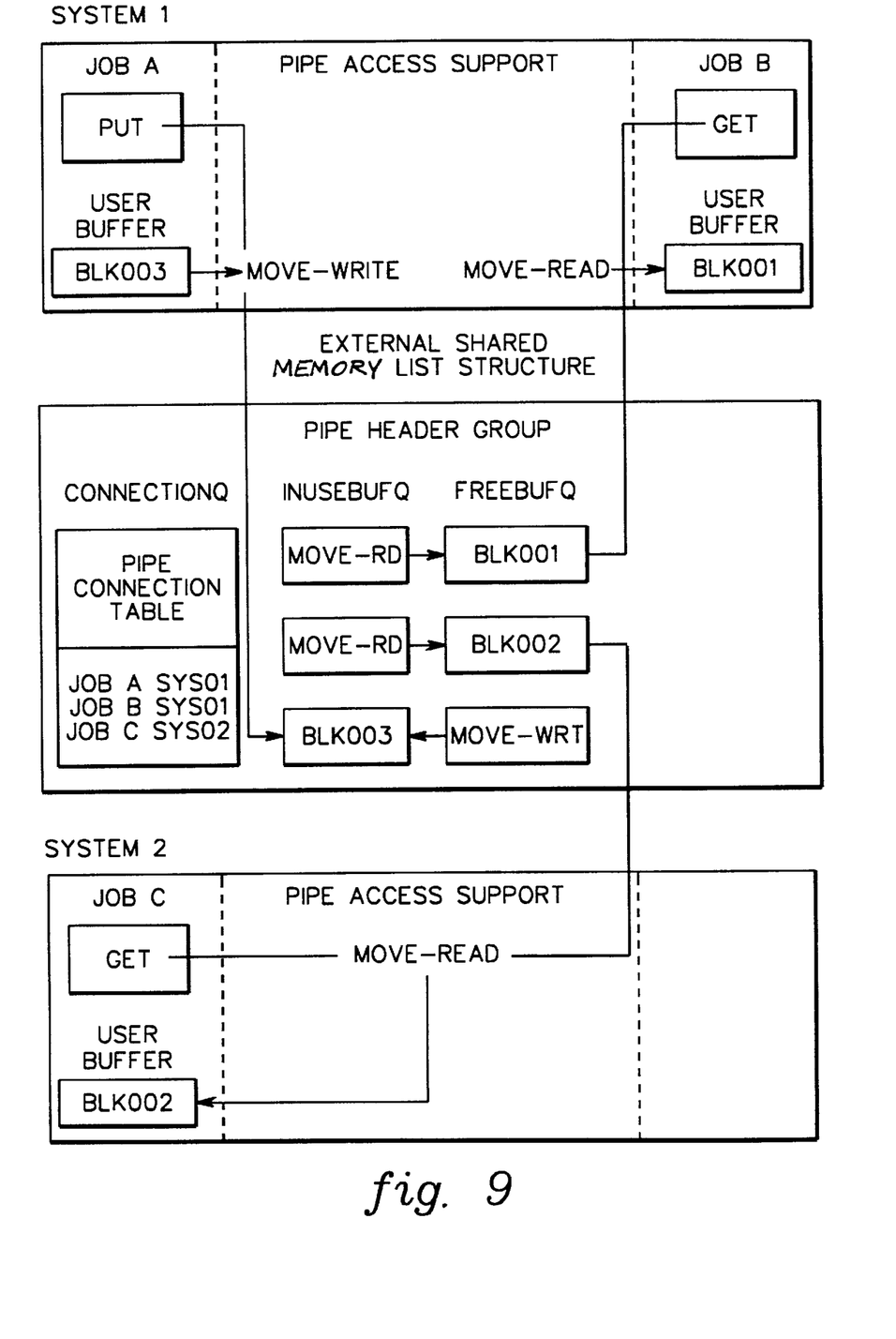
FIG. 9 depicts one example of cross-system Get and Put processing, in accordance with the principles of the present invention.

Referring to FIG. 9, in one embodiment, a first system, System 1, is executing two applications, Job A and Job B. Job A is a writer application writing data to the pipe and Job B is a reader application reading data from the same pipe. Additionally, a second system, System 2, is executing another application, Job C. Job C is also a reader application reading data from the same pipe.

In accordance with the principles of the present invention, Systems 1 and 2 can be included within the same central processing complex or different central processing complexes without departing from the spirit of the present invention. Regardless of whether they are located within the same or different complexes, they are participating in the cross-system piping capability of the present invention, as long as each of the systems has its own operating system image.

As shown in FIG. 9, when Job A issues a Put request, the pipe access support on System 1 issues a Move-Write operation to write the data in user buffer block Blk003 to a free block, which is placed at the bottom of the in-use buffer queue of the shared pipe. Similarly, when Job B issues a Get request, the pipe access support on System 1 issues a Move-Read operation to read the data from the buffer block currently at the top of the in-use buffer queue, BLK001, and to move the block to the bottom of the free buffer queue (not shown). Likewise, pipe access support on System 2 issues a Move-Read operation, when Job C issues a Get request. Again, the data is read from the buffer block currently at the top of the in-use buffer queue, which is BLK002. BLK002 is at the top once BLK001 is read.

Thus, it can be seen that multiple readers can access the same pipe as a writer. Additionally, in accordance with the principles of the present invention, multiple writers can also access the same pipe. Again, these multiple readers and writers can be from different systems, either within the same central processing complex or different central processing complexes. The pipe is shared across the systems.

In one embodiment, when a pipe is no longer needed by an application, the pipe is closed by the pipe access support of the system requesting the close. One example of the logic associated with close processing is described with reference to FIG. 10.

Figure 10:
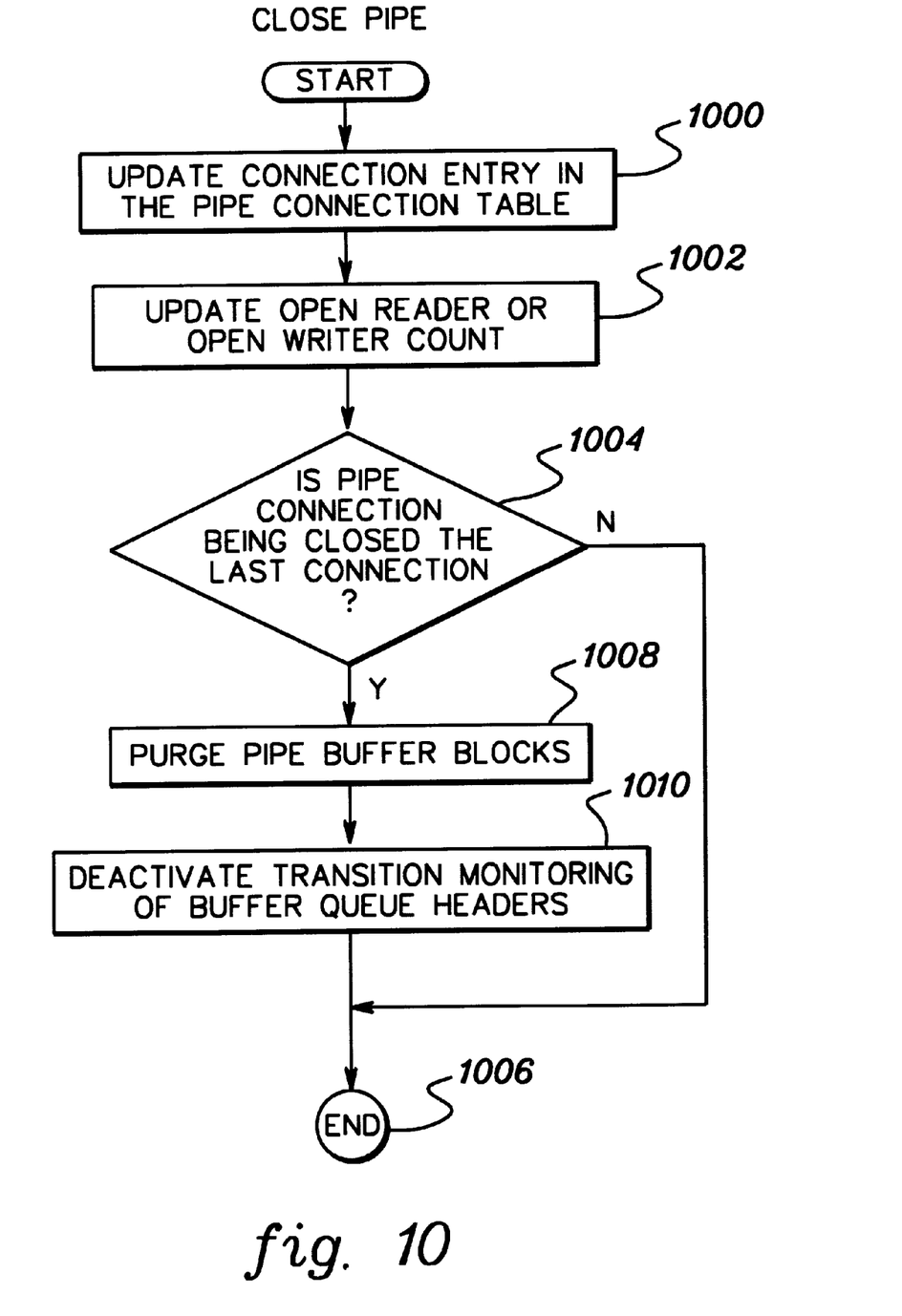
FIG. 10 depicts one example of the logic associated with closing a pipe, in accordance with the principles of the present invention.

When an application requests that a connection to a particular pipe be closed, the connection entry for that application located in pipe connection table 326 is updated to reflect that the connection to the pipe is no longer open, STEP 1000. Additionally, the open reader count or the open writer count in the pipe connection table is updated (e.g., decremented), depending on the type of connection being closed (i.e., a reader or a writer), STEP 1002.

Subsequently, a determination is made as to whether the connection being closed is the last connection to the pipe, INQUIRY 1004. If it is not the last connection, then the close processing is complete, STEP 1006. However, it is the last connection, then further actions are taken.

For instance, the pipe buffer blocks in the free buffer queue and/or the in-use buffer queue are purged, if this is the last connection to the pipe, STEP 1008. Further, the transition monitoring of the buffer queue headers is deactivated, if this is the last connection to the pipe for the system where the close was issued, STEP 1010. In one example, deactivation occurs by notifying the external shared memory that such monitoring is to cease. This is described in detail in the aforementioned U.S. Pat. No. 5,410,695, which is hereby incorporated herein by reference in its entirety. Thereafter, close processing is complete, STEP 1006.

After a pipe is closed for a particular application, the application can then request deallocation of the pipe or pipe deallocation is done implicitly by the operating system when the application terminates. Pipe deallocation is performed, for instance, by the pipe access support, and is described with reference to FIG. 11.

Figure 11:
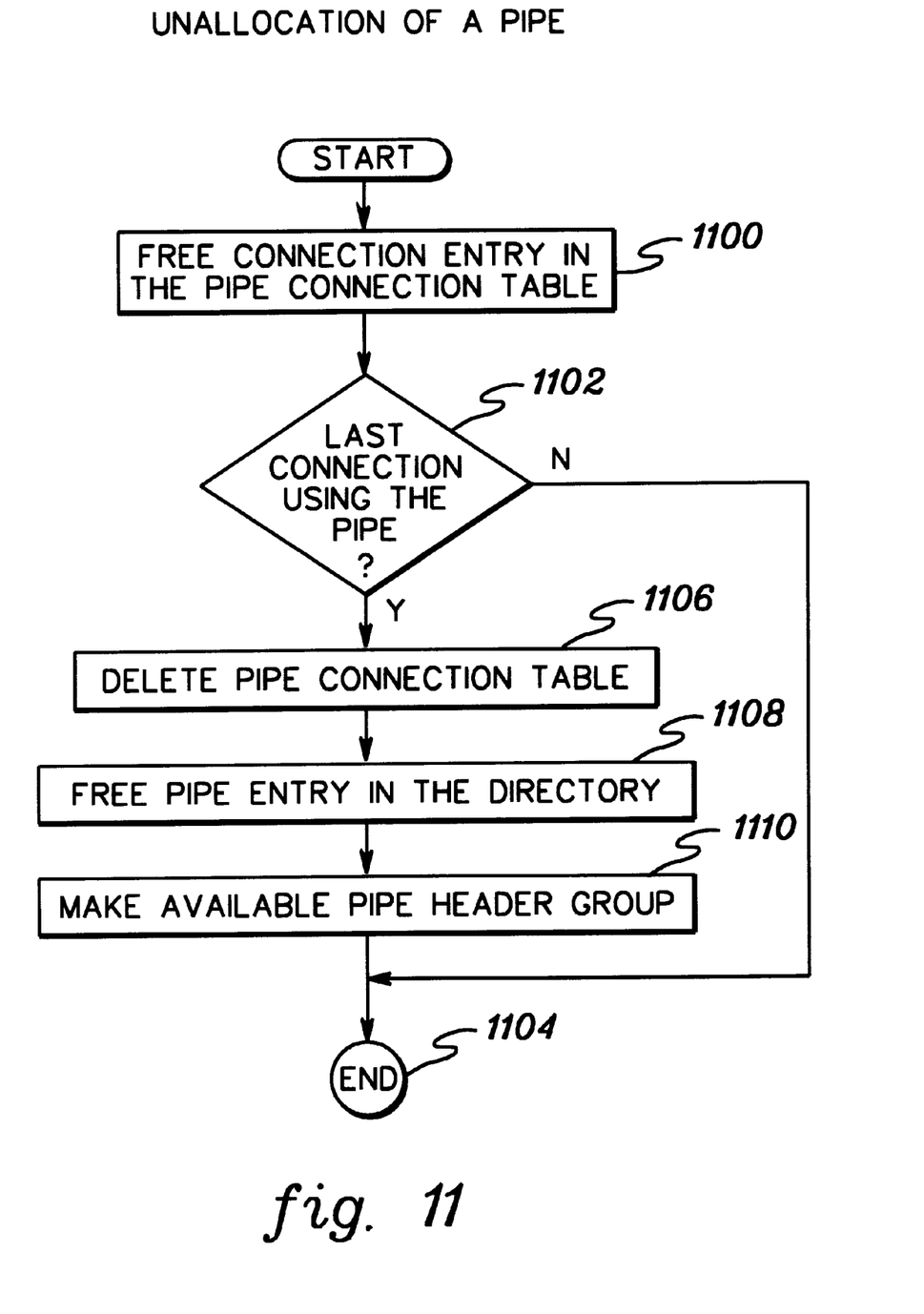
FIG. 11 depicts one example of the logic associated with deallocating a pipe, in accordance with the principles of the present invention.

In one example, during deallocation, the connection entry in pipe connection table 326 associated with the application requesting deallocation is freed, STEP 1100. Thereafter, a determination is made as to whether this was the last connection using the named pipe, INQUIRY 1102.

If this was not the last connection, then deallocation processing is complete, STEP 1104. However, if this was the last connection, then further actions are taken. For instance, the pipe connection table is deleted, since there are no more entries in the table, STEP 1106. Additionally, the pipe entry in pipe directory 316 for this pipe is freed, STEP 1108, and the pipe header group is made available for additional pipes, STEP 1110. Thereafter, deallocation processing is complete, STEP 1104.

Described in detail above are the structures and processing logic used by the present invention to facilitate cross-system data piping. As described, one or more shared pipes are located within an external shared memory coupled to one or more central processing complexes. Readers and writers within the one or more complexes read data from and write data to the shared pipes using the techniques of the present invention.

During the above processing, such as the allocate, deallocate, open, close, Get and Put processing, certain operations (e.g., certain read, write and update operations) are performed on the list structures within the external shared memory. In one embodiment, these operations are performed by commands processed by the external shared memory. Examples of these commands are described in detail in U.S. Pat. No. 5,410,695 "Apparatus and Method for List Management In a Coupled Data Processing System," Frey et al., issued on Apr. 25, 1995 and assigned to International Business Machines Corporation, which is hereby incorporated herein by reference in its entirety.

The cross-system data piping of the present invention advantageously allows more efficient distribution of work loads across the systems and helps to avoid overloading of a single system. To further distribute and manage work loads, different pipeplexes can be created, as described herein. The different pipeplexes can further dictate how work can be distributed.

The computing environment described above incorporating and using the present invention is only one example. Other environments can be used without departing from the spirit of the present invention. As one example, operating systems other than MVS may be used. Additionally, more than one external shared memory may be used.

As another example, the allocate, deallocate, open, close, Get and Put processing need not be implemented by the pipe access support. Other components of the systems can implement those processes. For example, the processes may be performed by the piping applications, the operating system, as well as the pipe access support, or any combination thereof.

As a further example, only one central processing complex need by coupled to the external shared memory. In a further example, the one complex has at least two systems (i.e., two operating system images) and each system is coupled to the external shared memory.

Additionally, the external shared memory described above is only one example. Other storage processors can be used without departing from the spirit of the present invention. For instance, a shared electronic storage having the following characteristics may be used:

It is capable of physically connecting to one or more systems.

It can include a named list structure, which has a specified number of list headers that can be used for queuing blocks of data. The space allocated not only contains the list headers, but also, a set of storage blocks in an internal free pool that can be assigned to application requests to create a block (i.e., data entry) on a specific list header (i.e., a queue).

It can include a specified number of locks as part of the list structure. The lock support provided with the electronic storage list structure allows a specified lock to be obtained either conditionally or unconditionally and, in the case of an unconditional request, the requesting dispatchable unit is suspended until the lock is available.

It allows names to be associated with each block of data that is created and written to a specific list header such that the block can later be referenced by name only in order to read it or update it.

It supports at least the following types of operations:
CONNECT—allows an application (e.g., the pipe access support) to establish connectivity to a specified (i.e., named) list structure on the shared electronic storage so it can perform operations against the structure. It also allows the application to specify the characteristics of a pipe, such as the number of list headers, the number of locks, etc.
DISCONNECT—allows an application to discontinue its connectivity to a specified list structure. Once this is done, the application can no longer perform operations against the structure until it connects to the list structure again.

WRITE CREATE—allows an application to create a new block of data at either the top or bottom of a specified list.

WRITE UPDATE—allows an application to update either a specifically named block or a specific block at the top or bottom of a specified list.

READ—allows an application to read a block of data by name no matter which list header it resides on, or to read a specific block of data at the top or bottom of a specified list. In the later case, the block of data is deleted when it is read (i.e., it is returned to the internal free pool).

MOVE-WRITE—allows an application to move a block of data from the top or bottom of a specified list to the top or bottom of another specified list and then update it in a single atomic operation.

MOVE-READ—allows an application to move a block of data from the top or bottom of a specified list to the top or bottom of another specified list and then read in the data in a single atomic operation.

DELETE—allows an application to delete a specifically named block no matter which list header it resides on, or to delete a specific block at the top or bottom of a specified list. When the block of data is deleted, it is returned back to the internal free pool associated with the list structure.

PURGEQ—allows an application to delete all blocks on a specified list. As the blocks are freed, they are returned back to the internal free pool associated with the list structure.

OBTAIN LOCK—allows an application to either conditionally or unconditionally obtain control of a specified list structure lock.

RELEASE LOCK—allows an application to release control of a list structure lock that it owns.

It allows a connector to a list structure to monitor specified list headers to detect when a header transitions from empty to nonempty. When a header does transition to nonempty, the monitoring support schedules a transition exit as specified by the connector at the time connectivity is made to the list structure.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A cross-system data piping system, comprising:
a first system adapted to write data to a pipe located within an external shared memory, said first system having a first operating system image and said external shared memory having processing capabilities, wherein said first operating system image manages one or more hardware resources through allocation and deallocation of said one or more hardware resources; and
a second system adapted to read data from said pipe, wherein said second system has a second operating system image, said second operating system image managing one or more hardware resources through allocation and deallocation of said one or more hardware resources, and wherein said external shared memory is coupled to said first system and said second system such that said pipe is separate from said first and second systems.

2. The system of claim 1, wherein said first system is located within a central processing complex coupled to said external shared memory and said second system is located within another central processing complex coupled to said external shared memory.

3. The system of claim 1, wherein said first system and said second system are located within a single central processing complex coupled to said external shared memory.

4. The system of claim 1, further comprising means for dynamically connecting said first system and said second system to said pipe, wherein a static connection between said first and second systems and said pipe is not necessary.

5. The system of claim 1, wherein said first system, said second system and said pipe are included in a first pipeplex.

6. The system of claim 5, further comprising means for dynamically joining said first pipeplex by another system.

7. The system of claim 5, further comprising a second pipeplex comprising another pipe located within said external shared memory and at least one system of said first system, said second system and another system.

8. The system of claim 7, wherein said pipe of said first pipeplex is located within a first list structure of said external shared memory and said another pipe of said second pipeplex is located within a second list structure of said external shared memory.

9. The system of claim 1, further comprising means for allocating said pipe.

10. The system of claim 9, wherein said means for allocating comprises the following, when said pipe is a new pipe:
means for assigning a pipe header group to said pipe, said pipe header group being located within said external shared memory;
means for creating a directory entry for said pipe in a pipe directory located within said external shared memory;
means for creating a pipe connection table within said external shared memory to track connections to said pipe; and
means for adding an entry in said pipe connection table for one of said writer and said reader requesting allocation of said pipe.

11. The system of claim 10, wherein said pipe header group, said pipe directory and said pipe connection table are located within a list structure located within said external shared memory.

12. The system of claim 9, wherein said means for allocating comprises the following, when said pipe is an existing pipe:
means for comparing one or more characteristics of said pipe with one or more characteristics specified by one of said writer and said reader requesting allocation of said pipe; and means for adding a connection entry to a pipe connection table within said external shared memory for said one of said writer and said reader requesting allocation of said pipe, when said comparison is satisfactory.

13. The system of claim 9, further comprising means for opening a connection to said pipe.

14. The system of claim 13, wherein said means for opening comprises:

means for updating a connection entry in a pipe connection table located within said external shared memory to indicate open processing;

means for creating one or more buffer blocks for a free buffer queue located within said external shared memory;

means for activating header transition monitoring;

means for updating a writer count or a reader count in said pipe connection table depending on whether said writer or said reader is requesting said open; and means for sending a message to any suspended open requests, when a desired number of reader and writer connections have been opened as indicated by at least one of said reader count and said writer count, to indicate open processing can continue for any suspended open requests.

15. The system of claim 14, wherein said pipe connection table and said free buffer queue are located within a list structure of said external shared memory.

16. The system of claim 13, further comprising means for closing an open connection to said pipe.

17. The system of claim 1, wherein said first system adapted to write is further adapted to:

determine whether a buffer block exists on a free buffer queue within said external shared memory; and perform a Move-Write operation when said buffer block exists, said Move-Write operation writing data to said buffer block and moving said buffer block from said free buffer queue to an in-use buffer queue located within said external shared memory.

18. The system of claim 17, wherein said writing data to said buffer block and said moving said buffer block are performed as one atomic operation.

19. The system of claim 17, wherein said first system is further adapted to do the following, when said buffer block does not exist:

suspend a request to write the data until said buffer block exists on said free buffer queue; and perform said Move-Write operation when said buffer block exists.

20. The system of claim 1, wherein said second system adapted to read is further adapted to:

determine whether a buffer block exists on an in-use buffer queue of said external shared memory; and perform a Move-Read operation when said buffer block exists, said Move-Read operation reading data from said buffer block and moving said buffer block from said in-use buffer queue to a free buffer queue within said external shared memory.

21. The system of claim 20, wherein said reading data from said buffer block and said moving said buffer block are performed as one atomic operation.

22. The system of claim 20, wherein said second system is further adapted to do the following, when said buffer block does not exits:

suspend a request to read the data until said buffer block exists; and perform said Move-Read operation when said buffer block exists.

23. A cross-system data piping system, comprising:

means for dynamically connecting a plurality of applications of a plurality of central processing complexes to a pipe located within an external shared memory, said external shared memory having processing capabilities and being coupled to said plurality of central processing complexes such that said pipe is separate from said plurality of central processing complexes, and wherein each central processing complex of at least two central processing complexes of said plurality of central processing complexes comprises an operating system, said operating system managing one or more hardware resources through allocation and deallocation of said one or more hardware resources;

means for writing data to said pipe by one or more of said plurality of applications; and means for reading data from said pipe by one or more of said plurality of applications.

24. The system of claim 23, wherein said pipe is located within a list structure of said external shared memory.

* * * * *